(12) United States Patent
Joung et al.

(10) Patent No.: US 8,345,080 B2
(45) Date of Patent: Jan. 1, 2013

(54) METHOD OF MONITORING 3G VIDEO TELEPHONY THROUGH DM PORT

(75) Inventors: Jinsoup Joung, Seongnam (KR); Youngsu Kwak, Suwon (KR); Jinman Kim, Seongnam (KR); Jaehwan Lee, Ansan (KR)

(73) Assignee: Innowireless Co., Ltd., Seongnam-si (KR)

( * ) Notice: Subject to any disclaimer, the term of this patent is extended or adjusted under 35 U.S.C. 154(b) by 1230 days.

(21) Appl. No.: 12/143,257

(22) Filed: Jun. 20, 2008

(65) Prior Publication Data
US 2009/0027481 A1  Jan. 29, 2009

(30) Foreign Application Priority Data
Jun. 22, 2007 (KR) .................. 10-2007-0061497

(51) Int. Cl.
*H04N 7/14* (2006.01)
*H04N 17/00* (2006.01)
(52) U.S. Cl. .................................... 348/14.02; 348/180
(58) Field of Classification Search .... 348/14.01–14.12; 455/67.11, 67.13
See application file for complete search history.

(56) References Cited

FOREIGN PATENT DOCUMENTS
WO   WO 2006038200 A1 *  4/2006
* cited by examiner

*Primary Examiner* — Curtis Kuntz
*Assistant Examiner* — Sunita Joshi
(74) *Attorney, Agent, or Firm* — Rothwell, Figg, Ernst & Manbeck, P.C.

(57) ABSTRACT

Disclosed herein is a method of monitoring 3G video telephony through a DM port. The method is performed using monitoring equipment in a state in which the monitoring equipment, provided with a driver module capable of opening the DM port of a mobile communication terminal for measurement, is connected to the mobile communication terminal. The method includes the steps of (a) opening the DM port of the mobile communication terminal, (b) setting up connection between the mobile communication terminal and a counterpart terminal by sending a key press command through the DM port, (c) sending H.324M protocol-based log commands through the DM port in order to receive voice or video data from the counterpart terminal, and receiving the voice or video data from the mobile communication terminal, (d) decoding and decompressing payload data of the received voice or video data, and (e) analyzing the decompressed voice or video data.

8 Claims, 2 Drawing Sheets

METHOD OF MONITORING 3G VIDEO TELEPHONY THROUGH DM PORT

BACKGROUND OF THE INVENTION

1. Field of the Invention

The present invention relates generally to a method of monitoring third generation video telephony through a Diagnostic Monitoring (DM) port and, more particularly, to a method of monitoring 3G video telephony through a DM port which enables an H.324M setup process or received voice/video to be automatically monitored through a DM port without installing the H.324M protocol stack, which is a video telephony and conference terminal system protocol, in monitoring equipment.

2. Description of the Related Art

Recently, with the help of the rapid development of the information/communication fields, mobile communication terminals have been popularized to the extent that they are regarded as items that must be carried by people today. Furthermore, it was a long time ago when voice calls or the transmission and reception of text messages were the principal functions of mobile communication terminals. With the advent of new technology, new models of mobile communication terminals having various functions have been marketed and have rapidly replaced old models of mobile communication terminals. In particular, a third generation (hereinafter simply referred to as '3G') communication network, that is, a W-CDMA network, capable of supporting video telephony or a video conference system, has been constructed, and video telephony service capable of enabling voice and video to be exchanged with a counterpart terminal through a mobile communication terminal in a stationary or moving state been introduced.

Meanwhile, terminal manufacturers need to check the quality of actually received voice/video using terminals, manufactured by them, in order to provide high-quality voice/video quality to customers, and mobile communication service providers need to check the quality of actual voice/video passed through a network in order to check and optimize the performance or state of a mobile communication network operated and maintained by them. In order to meet such needs, a system for automatically monitoring voice/video quality has been proposed. In the prior art automatic voice/video quality monitoring system, in order to perform 3G video telephony tests and voice/video data extraction on a notebook computer, which is used as monitoring equipment, the H.324M protocol, which is a protocol for 3G video telephony, must be ported to an application program and a video telephony emulator function is set for a mobile communication terminal.

However, the above-described automatic voice/video quality monitoring system has problems in that high costs are incurred in the construction of the system because the H.324M protocol stack is very expensive, and in that it is possible to perform a 3G video telephony test and received voice/video quality measurement only on mobile communication terminals in which a video telephony emulator function is installed.

SUMMARY OF THE INVENTION

Accordingly, the present invention has been made keeping in mind the above problems occurring in the prior art and an object of the present invention is to provide a method of monitoring 3G video telephony through a DM port, which enables an H.324M setup process or received voice/video to be automatically monitored through a DM port without installing the H.324M protocol stack, which is a video telephony and conference terminal system protocol, in monitoring equipment.

In order to accomplish the above object the present invention provides a method of monitoring 3G video telephony through a DM port, the method being performed using monitoring equipment in a state in which the monitoring equipment, provided with a driver module capable of opening the DM port of a mobile communication terminal for measurement, is connected to the mobile communication terminal for measurement, the method including the steps of (a) opening the DM port of the mobile communication terminal for measurement; (b) setting up connection between the mobile communication terminal for measurement and a counterpart terminal by sending a key press command through the DM port; (c) sending H.324M protocol-based log commands through the DM port in order to receive voice or video data from the counterpart terminal, and receiving the voice or video data from the mobile communication terminal for measurement; (d) decoding and decompressing payload data of the received voice or video data, not including headers; and (e) analyzing the decompressed voice or video data.

In the above construction, the counterpart terminal may be a wired video telephone connected to a circuit switched network for video telephony, a mobile communication terminal configured to have a video telephony function, or a VOD server connected to a packet switched network for VOD.

Preferably, the voice or video data received at step (c) is predetermined test voice or video data, and the analysis performed at step (e) is performed by comparing the test voice or video data with reference voice or video data using a Mean Opinion Score (MOS) algorithm. Furthermore, it is preferred that the method further includes the step of extracting and analyzing messages sent and received during a process of setting up the H.324M protocol.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
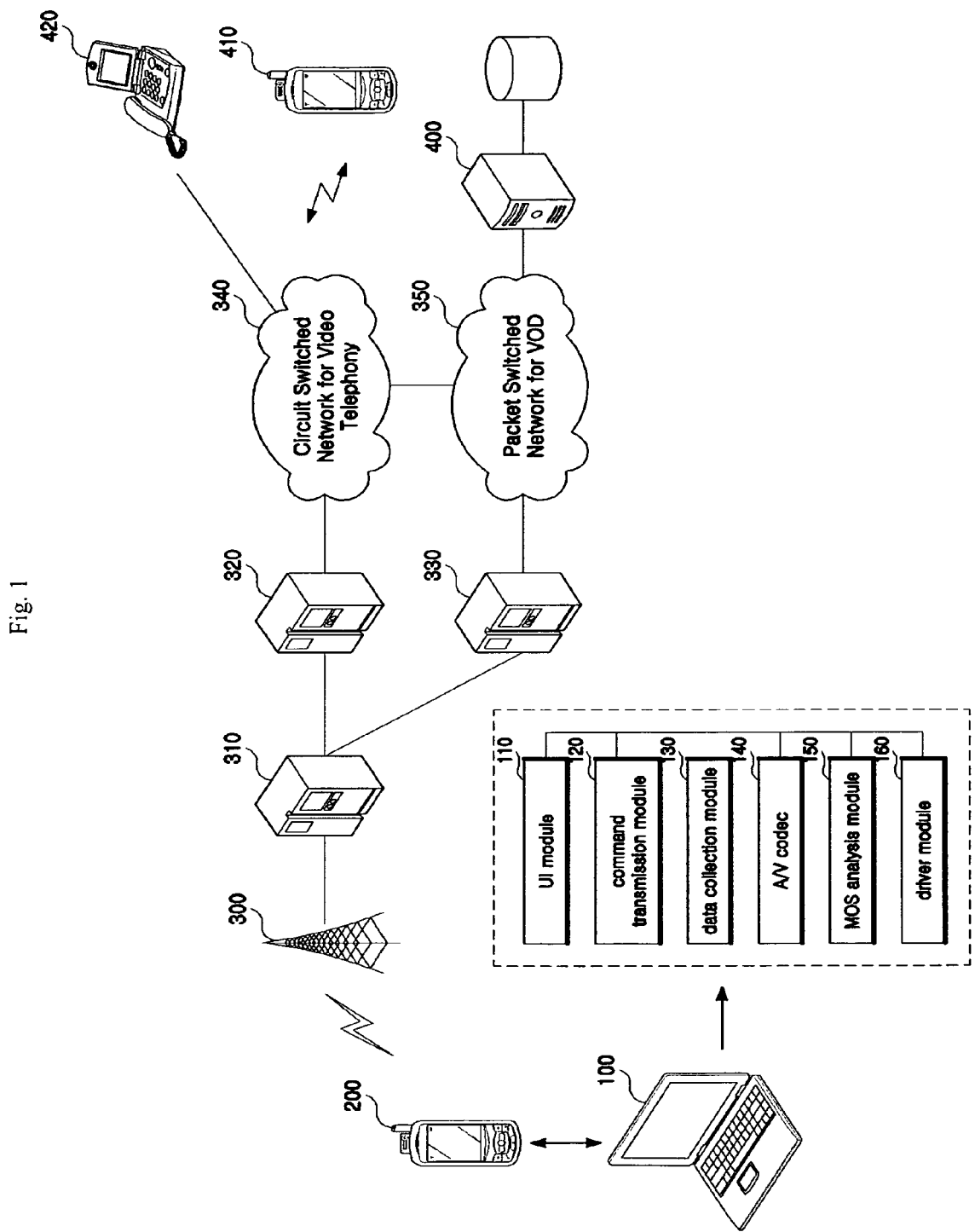
FIG. 1 is a diagram showing a network configuration in which a method of monitoring 3G video telephony through a DM port according to the present invention is implemented.

Reference now should be made to the drawings, in which the same reference numerals are used throughout the different drawings to designate the same or similar components.

A method of monitoring 3G video telephony through a DM port according to a preferred embodiment of the present invention will be described in detail below with reference to the accompanying drawings. Prior to the description, the H.324M protocol will be described in brief.

As is well known, the H.324M protocol is a protocol for video telephony and a conference terminal system using a typical telephone network, and was proposed to provide a mobile communication environment that overcame the limited mobility of H.323 protocol-based multimedia set-up boxes. The H.324M protocol was established not to provide for all rules and methods related to multimedia communication as an independent unit entity, but to exchange information necessary for communication based on lower-level protocols, which are divided into a plurality of protocol stacks. In particular, of the protocols, the H.245 protocol is a protocol that processes control messages that are exchanged by both H.324M-based end terminals to start or terminate communication, and is responsible for the function of a control protocol for the H.324M protocol.

FIG. 1 is a diagram showing the configuration of a network in which a method of controlling and analyzing a program installed in a mobile communication terminal according to the present invention is implemented. As shown in FIG. 1, the network in which the method of monitoring 3G video telephony through a DM port according to the present invention is implemented is configured such that a computer used as monitoring equipment 100, such as a notebook computer, is connected to a mobile communication terminal for measurement 200. The mobile communication terminal for measurement 200 is connected to a wired video telephone 420, a mobile communication terminal 410 having a video telephony function, or a VOD server 400, which is counterpart equipment, (hereinafter collectively referred to as a 'counterpart terminal') over a W-CDMA network, which is a 3G mobile communication network. In greater detail, the W-CDMA network may include a node B 300 for performing functions of radio signal transmission and reception, radio channel encoding and decoding, the measurement of signal intensity and quality, baseband signal processing, diversity, radio resource management and maintenance in connection with a mobile station, that is, the mobile communication terminal for measurement 200; a radio network controller 310 for performing functions of performing matching with the node B 300, inter-cell handover processing and call control through the control of a plurality of nodes B 300; a video telephony circuit switched network 340 configured such that the wired video telephone 420 or mobile communication terminal 410 having a video call function, which is counterpart equipment, is connected thereto; a Mobile Switching Center (MSC) 320 for, between a circuit switched network for video telephony 340 and the radio network controller 310, providing voice/video call and various additional functions, setting up a communication path, and connecting to various pieces of equipment and an external network; a packet switched network for VOD 350 configured such that it is connected to the VOD server 400, which is counterpart equipment, and is used to send voice/video data; and a Gateway GPRS Support Node (GGSN) for functioning as a serving node for General Packet Radio Service (GPRS), which provides packet service to a mobile communication terminal for measurement 200, and as a gateway in connection with the external network, and a Support GPRS Serving Node (SGSN) 330 for processing packet data between the radio network controller 310 and the GGSN.

Meanwhile, the notebook computer, which is the monitoring equipment 100, is connected to the standard connection terminal of the mobile communication terminal 200 for measurement through a USB terminal. The monitoring equipment 100 includes a user interface (UI) module 110 for enabling the identification number of the counterpart equipment such as the telephone number of the video telephone 410 or 420 or the URL of the VOD server 400, to be input enabling various types of log commands, which will be sent to the mobile communication terminal for measurement 200 through a DM port, to be set and displaying various results of the monitoring of video telephony; a command transmission module 120 for sending various types of log commands, set by a user, to the mobile communication terminal for measurement 200 through the DM port; a data collection module 130 for collecting various types of data, such as data (message) in the process of setting up H.324M or received voice/video data via the mobile communication terminal for measurement 200; a voice/video codec (hereinafter simply referred to as 'A/V codec') module 140 for decoding and restoring received compressed voice/video data; a Mean Opinion Score (MOS) analysis module 150 for measuring the quality of received voice/video by comparing the received voice/video with preset reference voice/video; and a driver module 160 for the mobile communication terminal for measurement 200 for performing a function of opening the DM port in connection with the mobile communication terminal for measurement 200.

Here, the 'DM port' refers to a logical port through which data, which belongs to the data sent and received through serial transmission and reception ports provided in, for example, the standard connection terminals of the mobile communication terminal, and which is used to analyze or monitor the operation of the terminal, is sent and received.

Furthermore, the MOS algorithm is an algorithm proposed to objectively measure the quality of voice and video over a communication network and automatically measure the grade of the sound or video quality of a test voice or video in comparison with a reference voice or reference video by comparing the test voice or test video, received over the communication network, with the reference voice or reference video. For example, the grades of the quality of test voice or video may be given in five steps, as listed in the following Table 1. In particular, it is preferred that the MOS algorithm be the MOS algorithm that is defined in J.144 rev. 1, recommended by the ITU-T.

TABLE 1

| MOS Value | Quality Grade |
|-----------|---------------|
| 5 | Excellent |
| 4 | Good |
| 3 | Fair |
| 2 | Poor |
| 1 | Bad |

Figure 2:
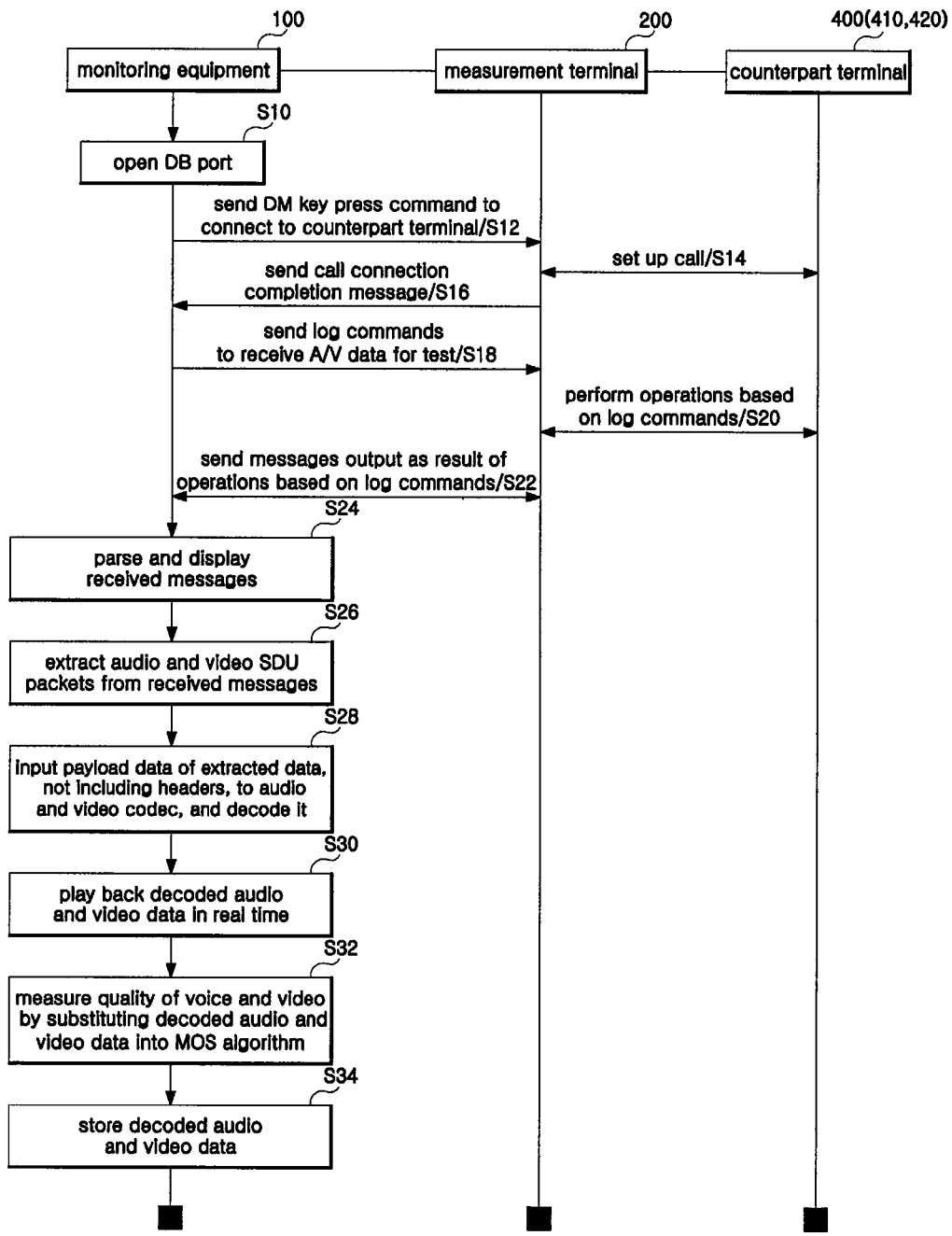
FIG. 2 is a flowchart illustrating the method of monitoring 3G video telephony through a DM port according to the present invention.

FIG. 2 is a flowchart illustrating a method of monitoring 3G video telephony through a DM port according to the present invention. As shown in FIG. 2, in the method of monitoring 3G video telephony through a DM port according to the present invention, in the state in which the notebook computer, which is the monitoring equipment 100, and the mobile communication terminal for measurement 200 are connected to each other through a cable, the DM port of the mobile communication terminal for measurement 200 is opened by driving the driver module 160 at step S10. Thereafter, at step S12, a DM key press command, including the identification number of the counterpart terminal 400, 410 or 420, is sent to set up connection to the counterpart terminal 400, 410 or 420. In compliance with the key press command, the mobile communication terminal for measurement 200 sets up the call connection to the counterpart terminal 400, 410 or 420 by performing step S14.

When the call connection to the counterpart terminal 400, 410 or 420 is set up as described above, the mobile communication terminal for measurement 200 sends a call connection completion message to the monitoring equipment 100 at step S16. Thereafter, the monitoring equipment 100 performs step S18 using the command transmission module 120, thus sequentially sending messages (data) in a process of setting up the H.324M protocol and the corresponding ones of the following log commands for the downlink of test voice/video data from the counterpart terminal 400, 410 or 420 to the mobile communication terminal for measurement 200. Examples of the log commands are given below.

H324 Downlink 223 MUX PDU (received PDU data before demultiplexing)

H324 Downlink Audio SDU (received audio data after demultiplexing and before input to codec)

H324 Downlink Video SDU (received video data after demultiplexing and before input to codec)

H324 Downlink 245 SIG SDU (received H.245 signaling message data)

H324 Uplink 223 MUX PDU
    H324 Uplink Audio SDU
    H324 Uplink Video SDU
    H324 Uplink 245 SIG SDU
    H324 Uplink Adaptation Layer 245
    H324 Downlink Adaptation Layer 245
    H324 Video Statistics
    H324 Video Encoder
    H324 Audio Decoder
    H324 Uplink Audio Sequence Number Time Stamp
    H324 Downlink Audio Sequence Number Time Stamp
    H324 Uplink Video Time Stamp
    H324 Downlink Video Time Stamp In connection with the above-described log commands, H.324M is composed of H.223 and H.245, wherein H.223 functions to multiplex and demultiplex actual data and send and receive data, while H.245 functions to open a channel through a signaling procedure in association with the counterpart terminal in order to send and receive data.

Referring back to FIG. 2, at step S20, operations based on the log commands are performed between the mobile communication terminal for measurement 200 and the counterpart terminal 400, 410 or 420, and, at step S22, various data messages, output as the results of the operations, are sent from the mobile communication terminal for measurement 200 to the monitoring equipment 100.

Then, the monitoring equipment 100 performs step S24, thus parsing the received messages using the data collection module 130 and displaying the results of the parsing on a monitor. The messages may include messages based on the process of setting up the H.324M protocol. At the same time, the monitoring equipment 100 performs step S26 using the data collection module 130, thus extracting an audio Service Data Unit (SDU) and a Video SDU from the received data messages, and performs step S28, thereby causing the payload data of the extracted data (messages), not including headers, to be input to and decoded in the audio codec and video codec 140. Here, the received audio SDU and video SDU are data that is previously set as test video in the counterpart terminal 400, 410 or 420.

Thereafter, the monitoring equipment 100 performs step S30, thus playing back the decoded audio and video data in real time and displaying the data on the monitor, and performs step S32, thus calculating the quality of the voice and video by processing the decoded audio and video data using the MOS analysis module 150.

Finally, at step S34, the decoded audio and video is stored in memory so as to enable the decoded audio and video data to be checked later.

In the above-described method of monitoring 3G video telephony through a DM port according to the present invention, a process of setting up H.324M or received voice/video can be automatically monitored through a DM port without the installation of the expensive H.324M protocol stack, which is a video telephony and conference terminal system protocol, in the monitoring equipment so that the costs for the construction of the system can be reduced and video telephony monitoring can be performed on a mobile communication terminal not equipped with a video telephony emulator function.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is Claimed is:

1. A method of monitoring third generation (3G) video telephony through a Diagnostic Monitoring (DM) port, the method being performed using monitoring equipment in a state in which the monitoring equipment, provided with a driver module capable of opening the DM port of a mobile communication terminal for measurement, is connected to the mobile communication terminal for measurement, the method comprising the steps of:

(a) opening the DM port of the mobile communication terminal for measurement;

(b) setting up a connection between the mobile communication terminal for measurement and a counterpart terminal by sending a key press command including an identification number of the counterpart terminal through the DM port;

(c) sending H.324M protocol-based log commands associated with downlink audio service data unit (SDU) or video SDU to the mobile communication terminal for measurement through the DM port in order to receive voice or video data from the counterpart terminal, and receiving the voice or video data from the mobile communication terminal for measurement;

(d) decoding and decompressing payload data of the received voice or video data, not including headers; and (e) analyzing the decompressed voice or video data.

2. The method as set forth in claim 1, wherein the counterpart terminal is a wired video telephone connected to a circuit switched network for video telephony or a mobile communication terminal configured to have a video telephony function.

3. The method as set forth in claim 2, wherein the counterpart terminal is a VOD server connected to a packet switched network for VOD.

4. The method as set forth in claim 3, wherein:

the voice or video data received at step (c) is predetermined test voice or video data; and the analysis perfoimed at step (e) is performed by comparing the test voice or video data with reference voice or video data using a Mean Opinion Score (MOS) algorithm.

5. The method as set forth in claim 1, further comprising the step of extracting and analyzing messages sent and received during a process of setting up the H.324M protocol.

6. The method as set forth in claim 2, further comprising the step of extracting and analyzing messages sent and received during a process of setting up the H.324M protocol.

7. The method as set forth in claim 3, further comprising the step of extracting and analyzing messages sent and received during a process of setting up the H.324M protocol.

8. The method as set forth in claim 4, further comprising the step of extracting and analyzing messages sent and received during a process of setting up the H.324M protocol.

\* \* \* \* \*